(12) United States Patent
Kai

(10) Patent No.: US 7,509,859 B2
(45) Date of Patent: Mar. 31, 2009

(54) ACCELERATION SENSOR WITH REDUNDANT CONTACT HOLES

(75) Inventor: Takayuki Kai, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 11/954,357

(22) Filed: Dec. 12, 2007

(65) Prior Publication Data

US 2008/0087087 A1 Apr. 17, 2008

Related U.S. Application Data

(63) Continuation of application No. 11/325,336, filed on Jan. 5, 2006, now Pat. No. 7,322,241.

(30) Foreign Application Priority Data

Jan. 20, 2005 (JP) .............................. 2005-013395

(51) Int. Cl.
*G01P 15/12* (2006.01)
(52) U.S. Cl. .................................. 73/514.33; 73/514.34
(58) Field of Classification Search .............. 73/514.33, 73/514.34, 514.36, 514.38, 514.16, 514.29; 338/2, 5
See application file for complete search history.

(56) References Cited

U.S. PATENT DOCUMENTS 4,641,539 A * 2/1987 Vilimek ................. 73/862.636
5,444,244 A * 8/1995 Kirk et al. .................... 250/306
5,537,882 A * 7/1996 Ugai et al. ..................... 73/727
5,998,816 A 12/1999 Nakaki et al.
6,763,719 B2 7/2004 Hatano et al.
6,931,928 B2 8/2005 Hashimoto et al.
7,010,976 B2 3/2006 Ozawa et al.
7,104,130 B2 * 9/2006 Kenny et al. ............. 73/514.33
7,111,514 B2 9/2006 Hatano et al.
7,281,427 B2 * 10/2007 Mori ........................ 73/514.33
7,322,241 B2 * 1/2008 Kai .......................... 73/514.33

FOREIGN PATENT DOCUMENTS

JP 2004198243 7/2004

\* cited by examiner

*Primary Examiner*—Helen C. Kwok
(74) *Attorney, Agent, or Firm*—Volentine & Whitt, P.L.L.C.

(57) ABSTRACT

An acceleration sensor includes a mass and a supporting member linked by a flexible beam. A strain detector having low-resistance areas at both ends is formed near a boundary between the beam and the mass or between the beam and the supporting member A dielectric film formed on the supporting member and the beam has multiple contact holes disposed over each low-resistance area. Wiring formed on the dielectric film is connected to the low-resistance areas through the contact holes. The provision of multiple contact holes for each low-resistance area extends the life of the acceleration sensor by preventing sensor failure due to the separation or other failure of any single contact.

17 Claims, 7 Drawing Sheets

ACCELERATION SENSOR WITH REDUNDANT CONTACT HOLES

CROSS-REFERENCE TO RELATED APPLICATIONS

This is a divisional application of application Ser. No. 11/325,336, filed on Jan. 5, 2006, which is hereby incorporated by reference in its entirety for all purposes.

BACKGROUND OF THE INVENTION

1. Field of the Invention

The present invention relates to a three-axis acceleration sensor, more particularly to technology for preventing faulty electrical contacts at the acceleration detection sites.

2. Description of the Related Art

Technology for detecting acceleration on three mutually orthogonal axes is described in, for example, Japanese Patent Application Publication No. 2004-198243. A piezoelectric acceleration sensor of the type disclosed in this Publication is shown schematically in FIGS. 1 and 2. FIG. 1 shows a plan view; FIG. 2 shows a sectional view through line I1-I2 in FIG. 1.

This acceleration sensor has a thin square first silicon layer 10, a thick square second silicon layer 20, and a bonding layer 30 by which the first and second silicon layers are joined. Substantially L-shaped openings 11 at the inside four corners of the first silicon layer 10 create a frame-shaped peripheral attachment section 12, a square mass attachment section 13 located centrally inside the peripheral attachment section 12, and four thin elongate beams 14 that link the mass attachment section to the peripheral attachment section. The four beams 14 are oriented in the x-axis and y-axis directions, which correspond to the lateral and longitudinal directions in the plane of the drawing sheet in FIG. 1. A pair of piezoelectric resistive elements 15-1, 15-2 are formed on the surface of each beam 14. The whole surface of the beams 14, including the piezoelectric resistive elements 15-1, 15-2, is covered with an interlayer dielectric film (not shown), on which metal wiring (also not shown) is formed. The metal wiring is electrically connected to the piezoelectric resistive elements 15-1, 15-2 through contact holes formed in the interlayer dielectric film.

The second silicon layer 20 comprises a peripheral frame 21 formed below the peripheral attachment section 12 in the first silicon substrate 10, surrounding a cavity 22 that extends in the vertical or z-axis direction clear through the second silicon layer 20 below the openings 11 and beams 14. A solid rectilinear mass 23 is formed below the mass attachment section 13, surrounded by the cavity 22. The height of the frame 21 in the z-axis direction exceeds the height of the mass 23. The upper surface of the frame 21 is bonded through the bonding layer 30 to the bottom surface of the peripheral attachment section 12, and the upper surface of the mass 23 is bonded through the bonding layer 30 to the bottom surface of the mass attachment section 13. The bottom surface of the frame 21 is bonded to a base 31.

The four beams 14 allow the mass 23 to sway or move in the x-axis, y-axis, and z-axis directions. When the sensor is accelerated, the mass 23 is displaced by a force proportional to the acceleration, the beams 14 bend, and the resulting strain changes the electrical resistance of the piezoelectric resistive elements 15-1, 15-2. The change is detected from signals routed through the piezoelectric resistive elements via the contact holes and the wiring. Suitable signal processing yields measurements of acceleration on each of the three axes.

When the beams 14 bend, the greatest stress occurs at the boundaries P1 between the peripheral attachment section 12 and the beams and the boundaries P2 between the mass attachment section 13 and the beams. Therefore, to maximize the sensitivity of the sensor, the piezoelectric resistive elements 15-1, 15-2 must be disposed near the boundaries P1, P2, where they will experience the greatest strain. At these locations, however, a large mechanical stress also acts on the interface between the wiring in the contact holes and the silicon surfaces of the piezoelectric resistive elements 15-1, 15-2, and can produce such unwanted effects as wire peeling and separation, which degrade the reliability and shorten the life of the sensor.

Given the trend toward smaller sensor form factors, the contact holes in future products can be expected to become smaller, so that the contact resistance will increase. Failure modes occurring within the contact holes (such as, for example, voids in metal wiring and silicon nodules or aggregates) will also become more likely to affect the contact resistance, and variations in contact resistance will become increasingly prevalent. Since the output current produced by a piezoelectric resistive element is very small, the contact resistance tolerance value is also small. Variations in contact resistance can therefore quickly push the resistance value above the tolerance level, so that the sensor does not perform as designed.

These problems have a serious effect on sensor life and reliability. In addition, the anticipated reduction of contact hole sizes and the attendant increased variation in contact resistance values will have a serious effect on future sensor performance.

SUMMARY OF THE INVENTION

A general object of the present invention is to provide an acceleration sensor that is both sensitive and reliable.

A more specific object is to enhance the sensor's immunity to electrical faults in contact holes formed in high-stress areas.

The invented acceleration sensor includes a mass, a supporting member surrounding the mass, and a beam that flexibly links the mass to the supporting member. A strain detector is formed as a single continuous unit with one end positioned on the beam and the other end positioned on the mass or the supporting member. The strain detector is covered by a dielectric film. The dielectric film has a plurality of contact holes disposed over the end of the strain detector disposed on the beam. Wiring is formed on the dielectric film and in the contact holes, making electrical contact with the strain detector.

The invented acceleration sensor has an extended life expectancy because it can survive an electrical fault in one contact hole without significant alteration of its electrical characteristics, provided adequate electrical contact is maintained in at least one other contact hole. The provision of multiple contact holes also facilitates the meeting of contact resistance tolerances.

The contact holes are preferably aligned in the longitudinal direction of the beam, so that stress from the bending of the beam will cause a failure in only one contact hole at a time. This arrangement also enables the width of the beams to be reduced.

DETAILED DESCRIPTION OF THE INVENTION

Figure 1:
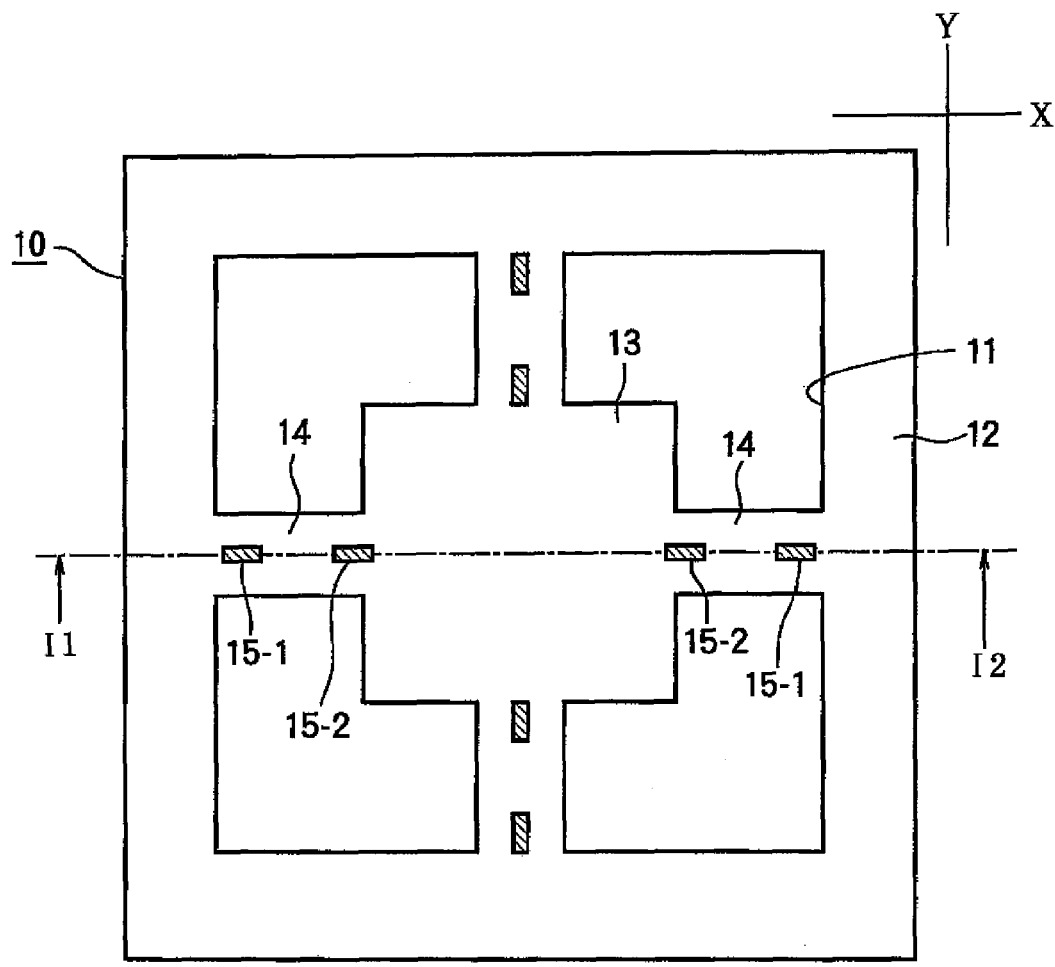
FIG. 1 is a plan view and FIG. 2 is a sectional view of a conventional piezoelectric three-axis acceleration sensor.
Figure 2:
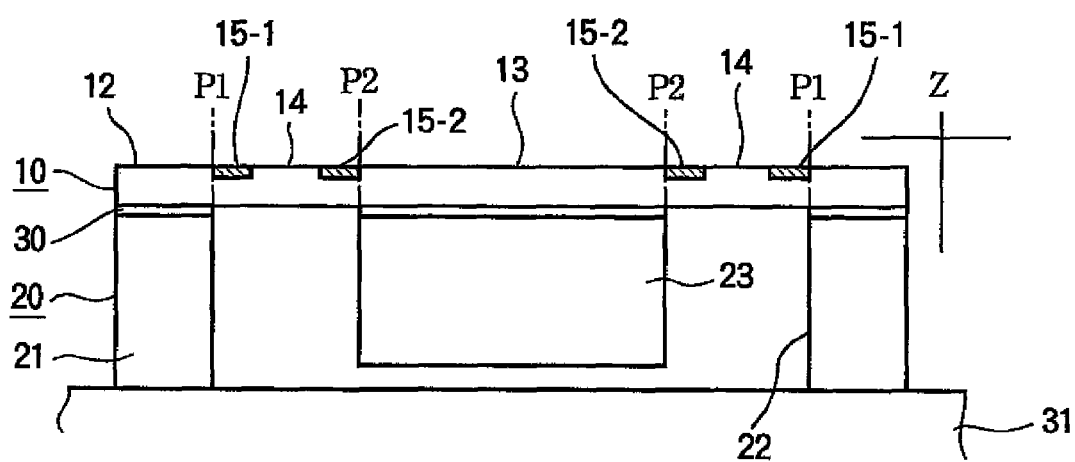

An embodiment of the invention will now be described with reference to the attached drawings, in which like elements are indicated by like reference characters.

Figure 4:
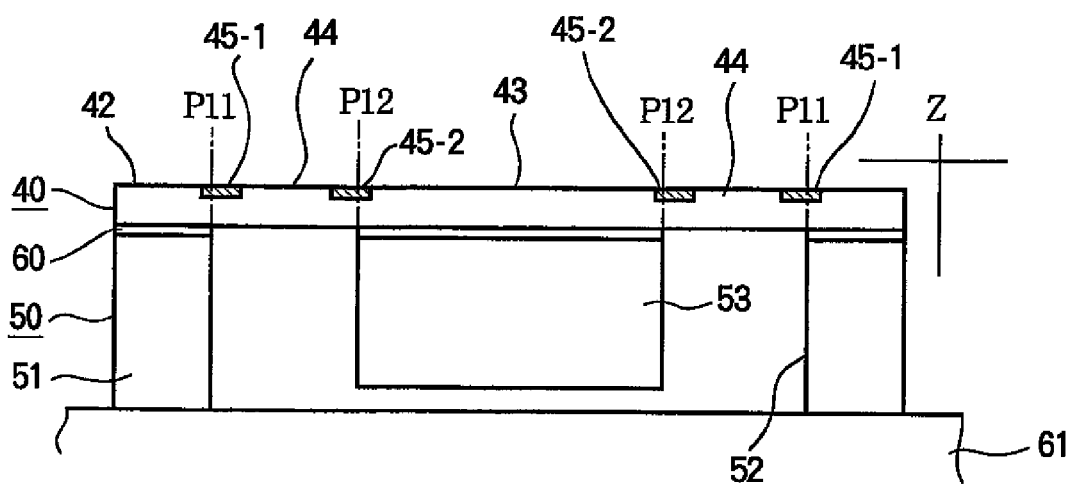
FIG. 4 is a sectional view of the piezoelectric three-axis acceleration sensor through line I11-I12 in FIG. 3.

Referring to FIG. 4, a piezoelectric three-axis acceleration sensor is formed by etching a silicon-on-insulator wafer comprising a first silicon layer 40 approximately five to ten micrometers (5 to 10 □m) thick and a second silicon layer 50 approximately 525 □m thick joined by a bonding layer 60 such as a buried silicon oxide layer (BOX layer) approximately 5 □m thick. The first silicon layer 40 is a semiconductor silicon layer doped with an n-type impurity and has a volume resistivity of about six to eight ohm-centimeters (6 to 8 Ω·cm). The second silicon layer 50 is a silicon substrate layer having a volume resistivity of about 16 Ω·cm.

Figure 3:
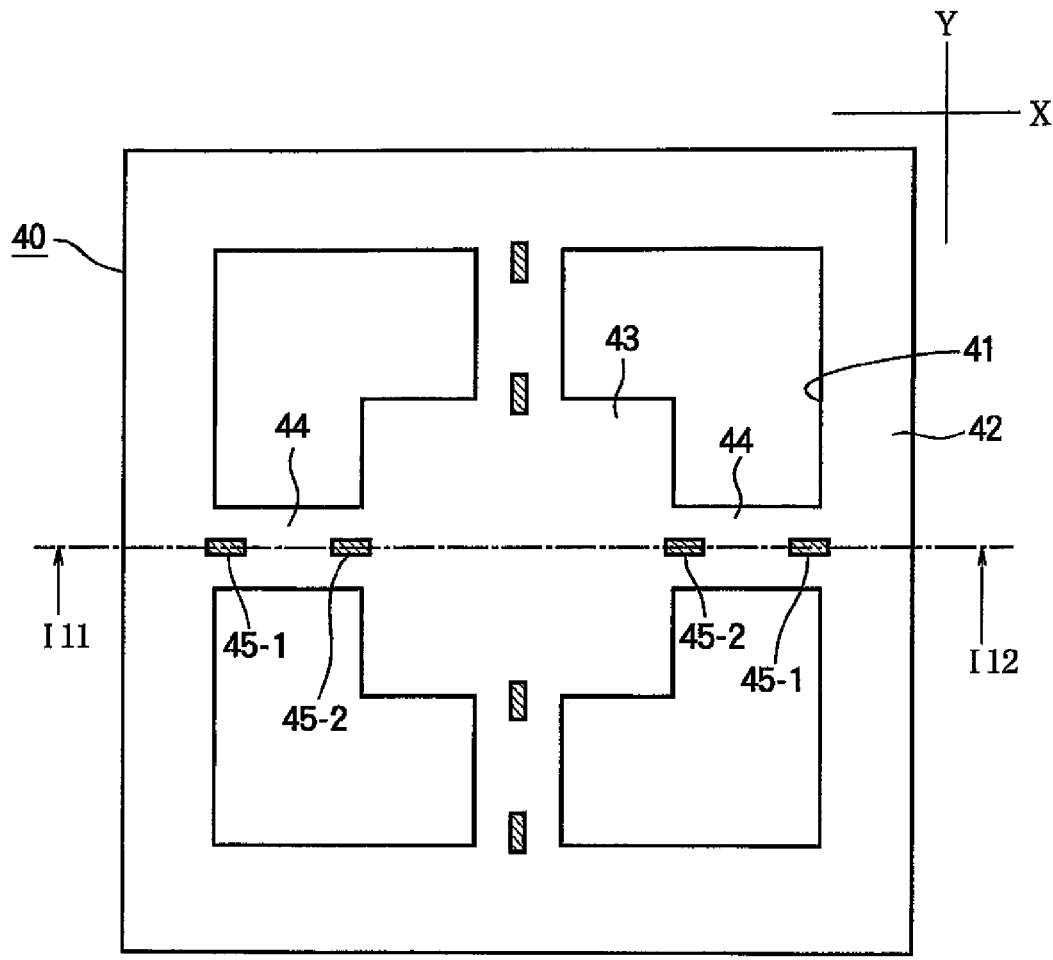
FIG. 3 is a plan view of a piezoelectric three-axis acceleration sensor embodying the invention.

Referring to FIG. 3, the first silicon layer 40 for one acceleration sensor is substantially square with sides approximately two and a half millimeters (2.5 mm) long, comprising L-shaped openings 41 near the four inner corners, a frame-like peripheral attachment section 42, a substantially square mass attachment section 43 in the center, and four elongate beams 44 approximately 400 □m in width, oriented in the x-axis and y-axis directions of the plane of the drawing sheet, linking the peripheral attachment section 42 and the mass attachment section 43. Pairs of piezoelectric resistive elements 45-1, 45-2 that vary in electrical resistance when strained are formed in the first silicon layer 40, at the upper surface of the first silicon layer 40 in FIG. 5, near the boundaries P11 between the beams 44 and the peripheral attachment section 42 and the boundaries P12 between the beams 44 and the mass attachment section 43. In each beam 44, piezoelectric resistive element 45-1 is disposed near (preferably straddling) boundary P11 and piezoelectric resistive element 45-2 is disposed near (preferably straddling) boundary P12.

The second silicon layer 50 comprises a peripheral frame 51 formed below the peripheral attachment section 42 in the first silicon layer 40, surrounding a cavity 52 that extends in the vertical or z-axis direction clear through the second silicon layer 50 below the openings 41 and beams 44. A solid rectilinear mass 53 is formed below the mass attachment section 43, surrounded by the cavity 52. The upper surface of the frame 51 is bonded through the bonding layer 60 to the bottom surface of the peripheral attachment section 42; the upper surface of the mass 53 is bonded through the bonding layer 60 to the bottom surface of the mass attachment section 43. The height of the frame 51 in the z-axis direction exceeds the height of the mass 53 by approximately 5 □m. The frame 51 and peripheral attachment section 42 constitute a supporting member that supports the beams 44. The bottom surface of the frame 51 is bonded by an adhesive or the like to a base 61 such as the floor of a package in which the sensor is enclosed.

Figure 5:
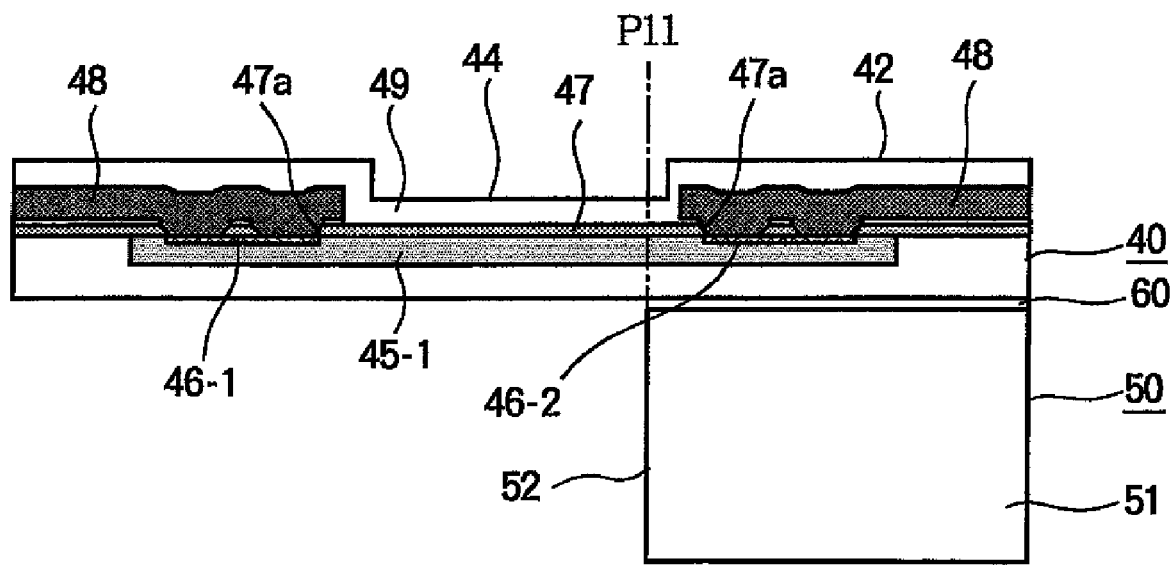
FIG. 5 is an enlarged sectional view showing the piezoelectric resistive element at the upper right in FIG. 4.
Figure 6:
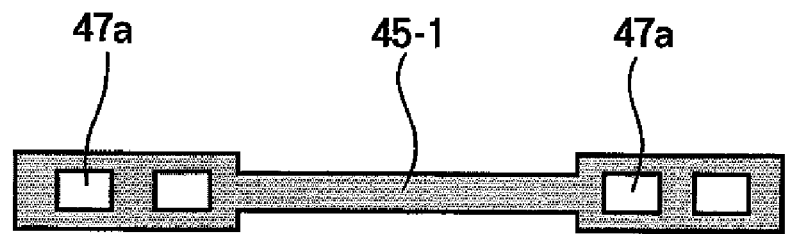
FIG. 6 is a plan view of the piezoelectric resistive element in FIG. 5.

Referring to FIG. 5, the first silicon layer 40 is an n-type semiconductor layer in which the piezoelectric resistive elements 45-1, 45-2 are, for example, p-type diffusion layers doped with ions of boron or another p-type impurity, formed at positions astride the boundaries P11, P12 respectively (FIG. 5 shows only one piezoelectric resistive element 45-1). Each piezoelectric resistive element 45-1 or 45-2 has a pair of low-resistance areas 46-1, 46-2 doped at high concentration with ions of boron or another p-type impurity, for example, formed at its two ends. An interlayer dielectric film 47 such as a silicon oxide film is formed on the whole surface of the first silicon layer 40 including the piezoelectric resistive elements 45-1, 45-2 and their low-resistance areas 46-1, 46-2. The interlayer dielectric film 47 has a plurality of contact holes 47a (two, for example, as shown in FIG. 6) disposed above each low-resistance area 46-1 or 46-2. Each contact hole 47a is a square with sides approximately 1 to 5 □m long. This size enables the contact resistance in a single contact hole to be low enough to meet the resistance tolerance of the sensor. A film of aluminum or another metal is deposited on the interlayer dielectric film 47 in the areas above the beams 44 and the peripheral attachment section 42, and is patterned to form wiring 48 that is electrically connected to the low-resistance areas 46-1, 46-2 via the contact holes 47a. The whole surface of the interlayer dielectric film 47, including the wiring 48, is covered with a protective film 49 such as a silicon nitride film.

The acceleration sensor described above is fabricated by, for example, the following process.

First, a silicon-on-insulator (SOI) wafer is obtained. The wafer includes the first silicon layer 40, the second silicon layer 50, and the bonding layer 60.

A first silicon oxide film is formed on the surface of the first silicon layer 40 by high-temperature thermal oxidation in a wet atmosphere. Openings are formed at predetermined positions in the first silicon oxide film by photolithography and etching, and ions of a p-type impurity such as boron are implanted through the openings to form p-type diffusion layers in the first silicon layer 40, which become the piezoelectric resistive elements 45-1, 45-2. Subsequently, a second silicon oxide film is formed on the whole surface of the first silicon layer 40 by thermal oxidation. Openings are then formed at predetermined positions in the second silicon oxide film by photolithography and etching, and ions of a p-type impurity such as boron are implanted with a high concentration through the openings to form low-resistance p-type diffusion layers, which become the low-resistance areas 46-1, 46-2.

An interlayer dielectric film 47 such as a silicon oxide film or other film is formed on the whole surface by chemical vapor deposition (CVD). Two contact holes 47*a* are formed in the interlayer dielectric film 47 above each of the low-resistance areas 46-1, 46-2 by photolithography and etching. A metal layer such as an aluminum layer is sputtered onto the entire surface of the interlayer dielectric film 47, filling the contact holes 47*a*. The metal layer is then patterned by photolithography and etching to form the wiring 48, which is thereby electrically connected to the piezoelectric resistive elements 45-1, 45-2 via the contact holes 47*a* and the low-resistance areas 46-1, 46-2. After that, a protective film 49 such as a silicon nitride film or other film is formed on the whole surface by plasma reactive deposition (PRD).

A layer of photoresist is applied to the surface of the protective film 49, and then the openings 41 are formed by photolithography and etching to define the peripheral attachment section 42, the mass attachment section 43, and the beams 44.

A third silicon oxide film is now formed by CVD on the reverse side of the SOI wafer, that is, the surface of the second silicon layer 50. The central portion of the third silicon oxide film is removed by photolithography and etching, while the periphery of the third silicon oxide film is left intact beneath the frame 51. The second silicon layer 50 is sculpted in two etching steps to form the cavity 52 and the mass 53, using the third silicon oxide film as an etching mask in the periphery during both etching steps and another film as an etching mask in the center during the first etching step.

After that, the acceleration sensor chip is diced from the SOI wafer, and is bonded by an adhesive or the like onto a base 61 such as the inner floor of a package. Finally, wire bonding and other necessary steps are performed to complete the fabrication process.

In this acceleration sensor, the four beams 44 can flex and twist, enabling the mass 53 to move as a whole in the z-axis direction and to sway in the x-axis and y-axis directions. These motions cause various combinations of tensile and compressive strain in the beams 44, which are detected as variations in the resistance values of the piezoelectric resistive elements 45-1, 45-2. Suitable processing of signals obtained from the piezoelectric resistive elements 45-1, 45-2 via the contact holes 47*a* and the wiring 48 enable acceleration to be measured on three mutually orthogonal.

Figure 9:
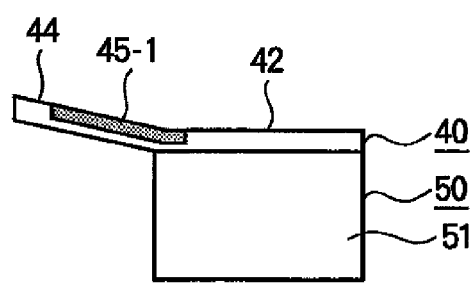
Figure 10:
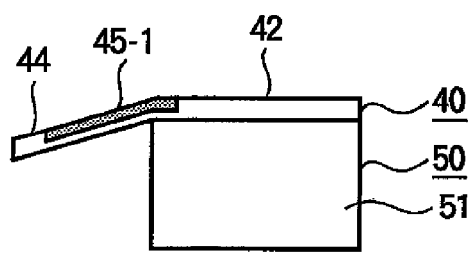

FIGS. 7, 8, 9, and 10 illustrate the strain detector 45-1 at a boundary P11 between the peripheral attachment section 42 and a beam 44. When the mass 53 in FIG. 4 is displaced by the force of acceleration, the beams 44 bend most at this boundary P11, and at the boundary P12 where the beams 44 are attached to the mass 53. FIGS. 9 and 10 illustrate bending at boundary P11. Upward displacement of the beam 44 compresses the surface of the piezoelectric resistive element 45-1 as shown in FIG. 9, whereas downward displacement of the beam 44 stretches the surface of the piezoelectric resistive element 45-1 as in FIG. 10. The maximum tension or compression is produced if the piezoelectric resistive element 45-1 is formed at the location shown, crossing the boundary P11 but with most of its length disposed within the beam 44, so that one end of the piezoelectric resistive element 45-1 is disposed in the peripheral attachment section 42 near the boundary P11. This location of the piezoelectric resistive element 45-1 results in maximum total strain in response to acceleration, and thus a maximum change in the electrical resistance by which the acceleration is measured. The maximum sensor sensitivity is accordingly obtained.

Similarly, the optimal position for the piezoelectric resistive element 45-2 at the other end of the beam 44 is astride the boundary P12 between the mass 53 and beam, with most of the length of the piezoelectric resistive element 45-2 lying within the beam, so that one end of the piezoelectric resistive element 45-2 is disposed in the mass attachment section 43 near the boundary P12.

Figure 11:
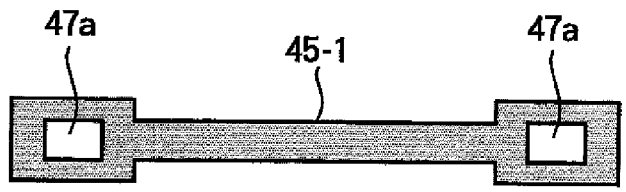
FIGS. 11 and 12 are a plan view and a sectional view of a conventional piezoelectric resistive element.
Figure 12:
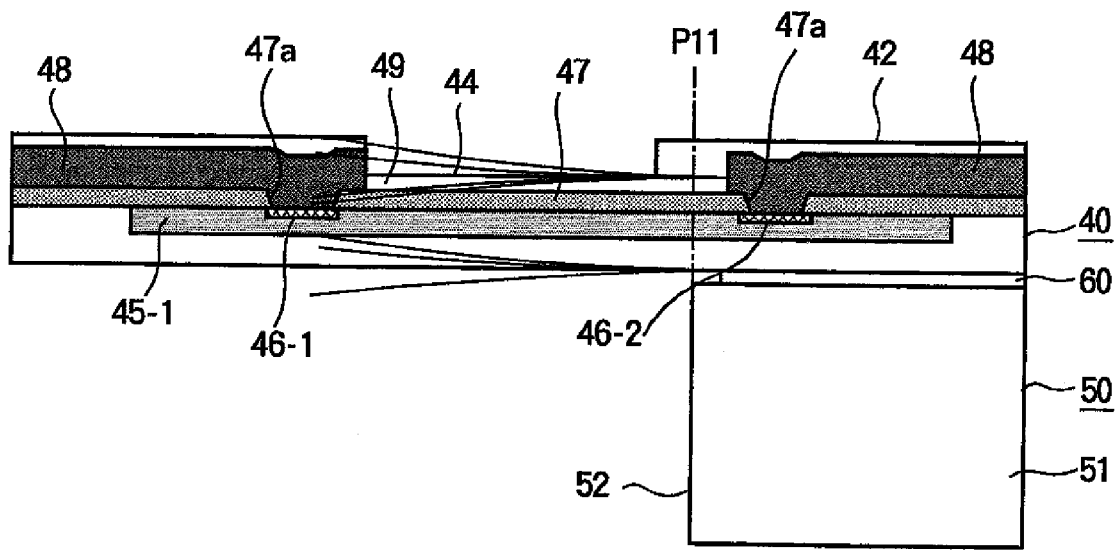

Although placing the piezoelectric resistive elements 45-1, 45-2 astride these boundaries with one end near the boundary produces maximum sensor sensitivity, it also places the electrical contact at that end at the greatest risk of strain-induced failure, including such failure modes as wire peeling and separation. The risk is particularly high if, as shown in FIGS. 11 and 12, each of the low-resistance areas 46-1, 46-2 at the ends of the piezoelectric resistive element 45-1 is connected through only one contact hole 47*a* to the wiring 48, which is the case in the prior art.

Figure 13:
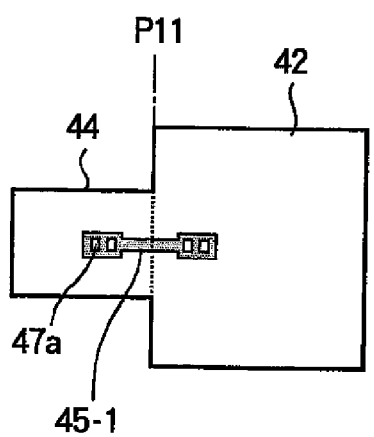
FIGS. 13, 14, and 15 are plan views showing alternative positions of the piezoelectric resistive element in FIG. 7.
Figure 14:
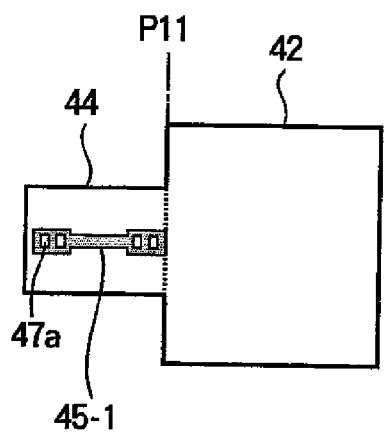
Figure 15:
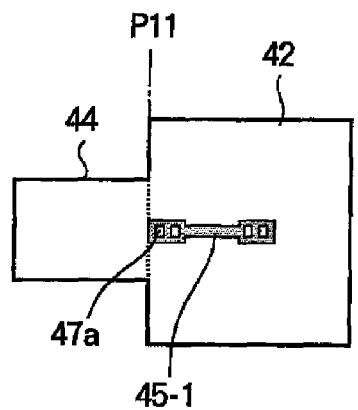

The risk of electrical contact failure can be reduced by positioning the piezoelectric resistive elements 45-1, 45-2 as shown in FIG. 13 or, to a lesser extent, as in FIG. 14 or 15.

The piezoelectric resistive element 45-1 in FIG. 13 is centered on the boundary P11 so that both of its ends are comparatively far from the boundary. A significant portion of the length of the piezoelectric resistive element 45-1 is then disposed in the peripheral attachment section 42, however, well removed from the boundary P11, and experiences comparatively little tension and compression under acceleration.

The piezoelectric resistive element 45-1 in FIG. 14 is disposed entirely within the beam 44, but this position completely misses the site of maximum tension and compression, which is at the boundary P11. Moreover, one end of the piezoelectric resistive element 45-1 is still near the boundary P11, and is therefore still at risk of strain-induced electrical contact failure.

The piezoelectric resistive element 45-1 in FIG. 15 is disposed entirely within the peripheral attachment section 42, so that for most of its length it experiences comparatively little tension and compression under acceleration. Moreover, the end of the piezoelectric resistive element 45-1 near the boundary P11 is still at approximately the same risk of strain-induced failure as in FIG. 7.

Figure 7:
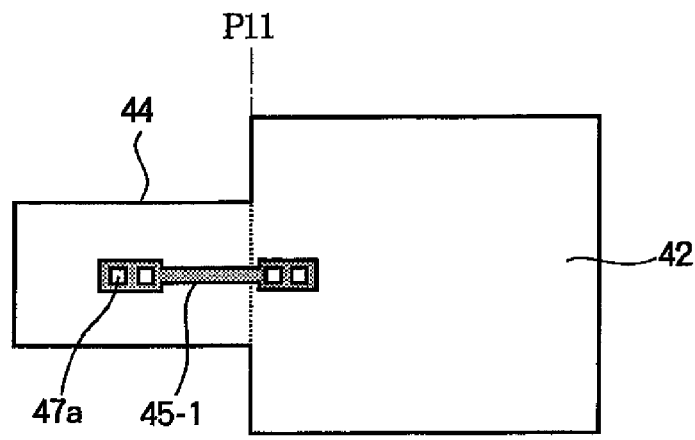
FIG. 7 is a plan view and FIGS. 8, 9, and 10 are sectional views of the piezoelectric resistive element in FIG. 5, illustrating the positional relationships among the peripheral attachment section, beam, and piezoelectric resistive element, and illustrating tensile and compressive strain.
Figure 8:
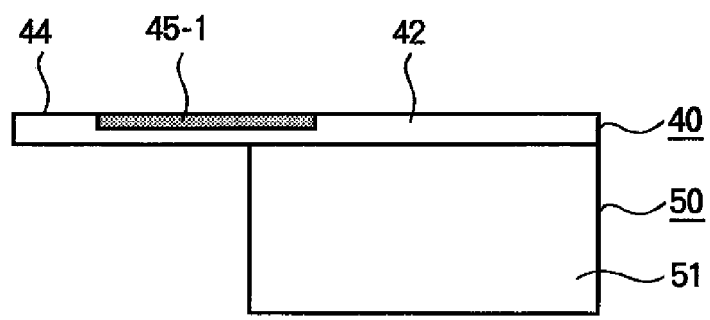

Accordingly, when sensitive acceleration sensing is required, the best location for a piezoelectric resistive element 45-1 is the location shown in FIGS. 5 and 7, with one end of the piezoelectric resistive element 45-1 astride the boundary P11.

The low-resistance area 46-2 at this end is not designed to straddle the boundary P11, but it is so close that, given the imperfect accuracy of current photolithography and etching technology, it may end up astride the boundary P11 because of a slight mask alignment error or etching error. These same sources of error also mandate the proximity of the design position of the low-resistance area 46-2 to the boundary P11, because if the design position of the low-resistance area 46-2 were to be shifted a little more to the right in FIG. 5, for example, then fabrication inaccuracy might move it farther to the right, resulting in an undesirable positioning of the type shown in FIG. 13.

Figure 16:
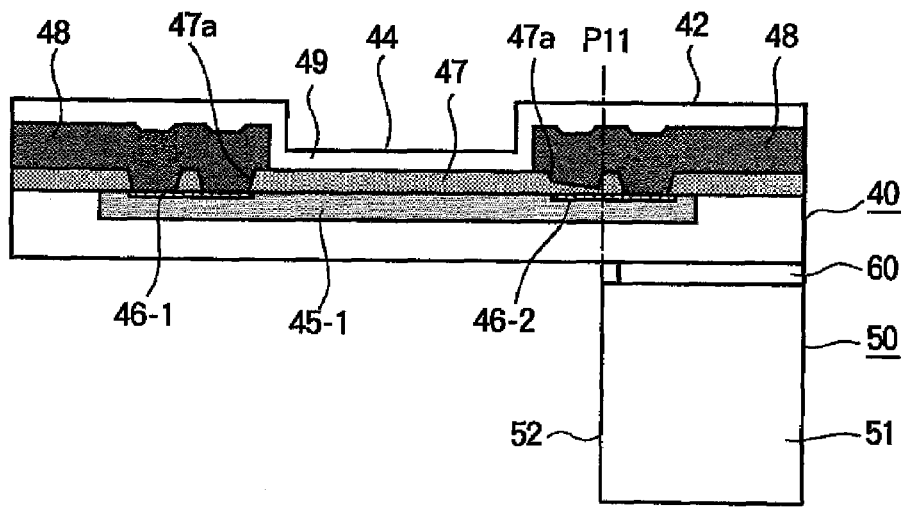
FIG. 16 is a sectional view of the piezoelectric resistive element in FIG. 5, illustrating wiring separation in one contact hole.

If fabrication inaccuracy moves the low-resistance area 46-2 slightly to the left in FIG. 5, the situation illustrated in FIG. 16 may occur, in which the low-resistance area 46-2 is right on the boundary P11. Because there are two contact holes 47*a* above this low-resistance area 46-2, however, and the two contact holes 47*a* are aligned in the longitudinal direction of the beam 44, only one of the two contact holes 47a is on the boundary P11. Stress at the boundary P11 may produce peeling in this contact hole 47a, but the interface between the wiring 48 and the low-resistance area 46-2 remains intact in the other contact hole, which is disposed slightly to the right of the boundary P11. Moreover, because each contact hole 47a provides sufficient contact area between the wiring 48 and the low-resistance area 46-2 to meet the contact resistance tolerance, the sensor performance does not change. That is, the failure of the electrical contact in one contact hole 47a does not shorten the life of the sensor.

Figure 17:
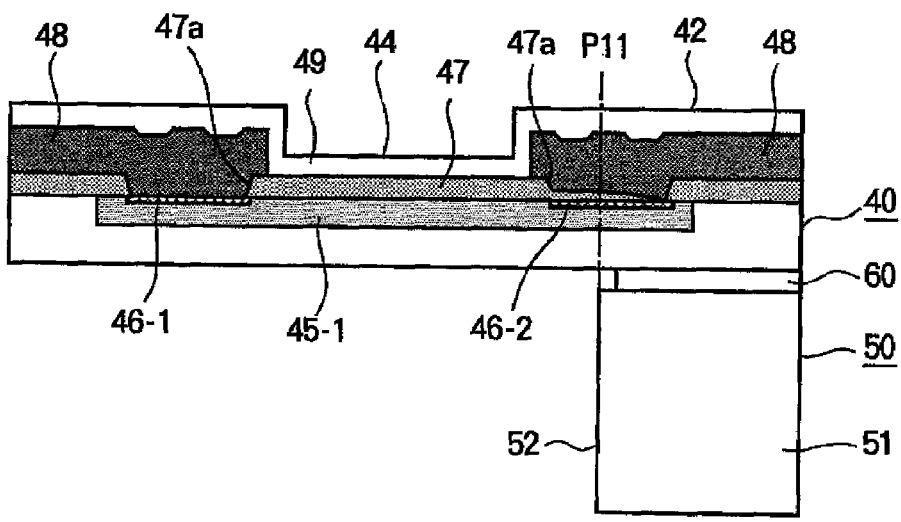
FIG. 17 is a sectional view of an alternative piezoelectric resistive element, illustrating wiring separation in one contact hole.

FIG. 17 illustrates an alternative design in which the two contact holes 47a above the low-resistance area 46-2 in FIG. 16 are merged into a single elongated contact hole 47a. This design is inferior to the design in FIG. 16 for the following reason.

In FIGS. 16 and 17, once peeling starts at a contact hole, repeated episodes of acceleration cause the peeling to progress. This occurs in the structures in both FIGS. 16 and 17, but there is a difference in the rate of progress. The interface between the low-resistance area 46-2 and wiring 48 in FIG. 17 is a single flat plane, on which peeling can progress easily and comparatively rapidly. In FIG. 16, the interface is interrupted by the presence of the interlayer dielectric film 47 between the two contact holes 47a, and the undersurface of the wiring 48 does not have a single flat profile. The peeling process stops when it encounters the interlayer dielectric film 47 between the two contact holes 47a, and does not readily resume in the second contact hole. In FIG. 17, even if the acceleration sensor has passed its initial factory tests without problem, the wiring 48 may peel completely away from the low-resistance area 46-2 fairly quickly, as shown, abruptly ending the useful life of the sensor. This is less likely to happen in FIG. 16.

A similar situation obtains in the piezoelectric resistive element 45-2 disposed on the boundary P12 between the beam 44 and the mass 53.

By placing the piezoelectric resistive elements 45-1 and 45-2 at positions astride the boundaries P11 and P12 and providing multiple contact holes 47a (two in the drawings, but three or more are possible) aligned longitudinally at each end of the piezoelectric resistive elements 45-1, 45-2, the present embodiment provides the following effects.

(a) Extended Sensor Life

The factors that limit the life of an acceleration sensor are breaking of the flexible beams 44 and wiring degradation. A particularly important factor is degradation of wiring interfaces at electrical contacts near the highly stressed sites where the beams flex the most. The present embodiment extends sensor life by providing a plurality of contact holes 47a (two, or three or more) for each electrical contact area, preferably disposed in single file in the longitudinal direction of each beam 44.

The reason why this extends the sensor life is that even it good electrical contact is lost in one contact hole 47a, the remaining contact holes 47a can provide sufficient electrical contact to enable the sensor to keep operating with unaltered electrical characteristics. To obtain this effect, the low-resistance areas 46-1, 46-2 must be heavily doped, so that their electrical resistance is much lower than the resistance of the other parts of the piezoelectric resistive elements, and so that they offer low contact resistance to the wiring 48 in the contact holes 47a. Each low-resistance area 46-1, 46-2 must also be continuous; that is, the multiple contact holes 47a at each end of the piezoelectric resistive element must share the same low-resistance area 46-1 or 46-2 at that end.

Figure 18:
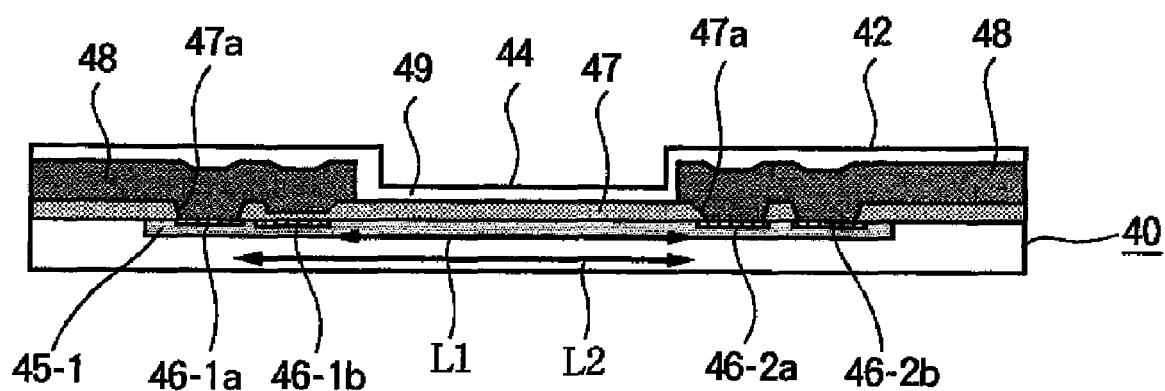
FIG. 18 is a sectional schematic view of another alternative piezoelectric resistive element, illustrating wiring separation in one contact hole.

If the low-resistance areas 46-1, 46-2 are not continuous, that is, if each contact hole 47a terminates on a separate low-resistance diffusion layer 46-1a, 46-1b, 46-2a, 46-2b as shown in FIG. 18, then when a conduction failure occurs due to, for example, wire peeling at the interface between the wiring 48 and low-resistance area 46-1b, the intended effective length L1 of the piezoelectric resistive element 45-1 changes to a longer length L2, altering the electrical characteristics of the sensor so that it does not perform as designed.

In other words, to enable the sensor to survive the loss of good electrical contact in any one contact hole, it is necessary to design the sensor so that such a loss of contact will have no significant impact on the sensor's response to acceleration.

Aligning the contact holes 47a at each end of the piezoelectric resistive element parallel to the width instead of the length of the piezoelectric resistive element can also be expected to extend the sensor life. The boundaries P11, P12, where the maximum bending stress occurs, are also parallel to the width of the piezoelectric resistive element, however, so parallel alignment in this direction would allow all of the contact holes 47a to be damaged at the same time. To avoid this situation, alignment in the longitudinal direction is preferred.

(b) Reduction of Sensor Size

When future semiconductor acceleration sensors are considered, as with other semiconductor devices, a reduction in size is a natural trend. Aligning the plurality of the contact holes 47a longitudinally is also an effective strategy in this regard.

A reduction in a semiconductor acceleration sensor size means a reduction in the size of the mass 53, so to obtain performance equivalent to the performance before the reduction, it is necessary for the beams 44 to be made more flexible. Typically, this means that the beams 44 must have a narrower width. That may not be practical, however, if the beams 44 must be wide enough to accommodate a single comparatively large contact hole at each end of each piezoelectric resistive element. Wiring related issues (the wire formed on a contact hole 47a must generally be wider than the contact hole 47a) pose particular problems in this respect. An effective method of obtaining the desired beam width is to reduce the size of each contact hole 47a, but to increase the number of the contact holes 47a so as to obtain the same aggregate contact resistance as before the reduction, and align the contact holes 47a in the longitudinal direction of the beams.

(c) Enhanced Immunity to Contact Hole Problems

Contact hole problems that afflict other semiconductor devices, including problems such as patterning failures (failure to form openings), formation of silicon nodules, solid phase epitaxial growth, and so on, can also occur in acceleration sensors, and can alter electrical contact resistance, resulting in inadequate sensor performance. Increasing the number of the contact holes 47a from one to two or more reduces the effect of the occurrence of these problems, because the sensor can tolerate the loss or degradation of contact in any one contact hole.

Variations

The present invention is not limited to the above embodiment; various modifications are possible, including the following.

(1) The essential elements in FIGS. 3 to 7 are the mass (including the mass attachment section), the supporting member surrounding the mass, a beam flexibly linking the mass to the supporting member, a continuous low-resistance area disposed near a boundary between the beam and the mass or a boundary between the beam and the supporting member, a dielectric film having a plurality of contact holes disposed over the continuous low-resistance area, and wiring formed on the dielectric film, connected to the continuous low-resistance area through the contact holes. Provided these elements remain present, the configuration shown in FIGS. 3 to 7 may be modified in many ways.

(2) The contact holes may have different sizes.

(3) Contact holes formed near the mass may have a different size from contact holes formed near the supporting member.

(4) While the simple provision of a plurality of contact holes at each end of each piezoelectric resistive element is in itself effective, a greater effect can be obtained if the contact holes are aligned in the longitudinal direction of the beam.

(5) In each beam, just one of the piezoelectric resistive elements 45-1, 45-2 may be disposed on the boundary P11 or P12, and its position may be adjusted to adjust the relative sensitivity in the x-axis, y-axis, and z-axis directions.

(6) The acceleration sensor may comprise a semiconductor material other than silicon, and its shape is not limited to a square. For example, the acceleration sensor may be rectangular or circular. The shape of the mass, the number of beams supporting the mass, and the number of piezoelectric resistive elements per beam may also be modified.

Those skilled in the art will recognize that further modifications are possible within the scope of the invention, which is defined in the appended claims.

What is claimed is:

1. An acceleration sensor comprising:
    a mass;
    a supporting member surrounding the mass;
    a beam flexibly linking the mass to the supporting member;
    a strain detector formed as a single continuous unit on the supporting member and the beam, the strain detector having a first end formed on the beam and a second end formed on the supporting member;
    a dielectric film at least covering the strain detector, the dielectric film having a plurality of first contact holes disposed over the first end of the strain detector and a second contact hole disposed over the second end of the strain detector;
    first wiring formed on the beam and in the first contact holes, making electrical contact with the strain detector; and
    second wiring formed on the supporting member and in the second contact hole, making electrical contact with the strain detector.

2. The acceleration sensor of claim 1, wherein the dielectric film has a plurality of second contact holes disposed over the second end of the strain detector, said second contact hole being one of said plurality of second contact holes, and the second wiring is formed in the plurality of second contact holes, making electrical contact therethrough with the strain detector.

3. The acceleration sensor of claim 1, wherein the first contact holes have different sizes.

4. The acceleration sensor of claim 1, wherein the strain detector includes a low-resistance area and the first wiring makes electrical contact with the low-resistance area of the strain detector.

5. The acceleration sensor of claim 1, wherein the first contact holes are mutually aligned in a longitudinal direction of the beam.

6. An acceleration sensor comprising:
    a mass;
    a supporting member surrounding the mass;
    a beam flexibly linking the mass to the supporting member;
    a strain detector formed as a single continuous unit on the mass and the beam, the strain detector having a first end formed on the beam and a second end formed on the mass;
    a dielectric film at least covering the strain detector, the dielectric film having a plurality of first contact holes disposed over the first end of the strain detector and a second contact hole disposed over the second end of the strain detector;
    first wiring formed on the beam and in the first contact holes, making electrical contact with the strain detector; and
    second wiring formed on the mass and in the second contact hole, making electrically contact with the strain detector.

7. The acceleration sensor of claim 6, wherein the dielectric film has a plurality of second contact holes disposed over the second end of the strain detector, said second contact hole being one of the plurality of second contact holes, and the second wiring is formed in the plurality of second contact holes, making electrical contact therethrough with the strain detector.

8. The acceleration sensor of claim 6, wherein the first contact holes have different sizes.

9. The acceleration sensor of claim 6, wherein the strain detector includes a low-resistance area and the first wiring makes electrical contact with the low-resistance area of the strain detector.

10. The acceleration sensor of claim 6, wherein the first contact holes are mutually aligned in a longitudinal direction of the beam.

11. An acceleration sensor comprising:
    a mass;
    a supporting member surrounding the mass;
    a beam flexibly linking the mass to the supporting member, the beam being joined to the supporting member at a first boundary and to the mass at a second boundary;
    a first strain detector formed as a single continuous unit on the supporting member and the beam, the first strain detector having a first end formed on the beam and a second end formed on the supporting member;
    a second strain detector formed as a single continuous unit on the mass and the beam, the second strain detector having a first end formed on the beam and a second end formed on the mass;
    a dielectric film at least covering the first strain detector and the second strain detector, the dielectric film having a plurality of first contact holes disposed over the first end of the first strain detector and a plurality of second contact holes disposed over the first end of the second strain detector; and
    first wiring formed on the beam and in the first contact holes and the second contact holes, making electrical contact with the first strain detector and the second strain detector.

12. The acceleration sensor of claim 11, wherein the dielectric film has a third contact hole disposed over the second end of the first strain detector and a fourth contact hole disposed over the second end of the second strain detector, the acceleration sensor further comprising:
    second wiring formed on the supporting member and in the third contact hole, making electrical contact with the first strain detector; and
    third wiring formed on the mass and in the fourth contact hole, making electrical contact with the second strain detector.

13. The acceleration sensor of claim 11, wherein the dielectric film has a plurality of third contact holes disposed over the second end of the first strain detector and a plurality of fourth contact hole disposed over the second end of the second strain detector, the acceleration sensor further comprising:
- second wiring formed on the supporting member and in the third contact holes, making electrical contact with the first strain detector; and
- third wiring formed on the mass and in the fourth contact holes, making electrical contact with the second strain detector.

14. The acceleration sensor of claim 11, wherein the first contact holes have different sizes and the second contact holes have different sizes.

15. The acceleration sensor of claim 11, wherein the first strain detector includes a first low-resistance area and the first wiring makes electrical contact with the first low-resistance area of the first strain detector.

16. The acceleration sensor of claim 11, wherein the second strain detector includes a second low-resistance area and the first wiring makes electrical contact with the second low-resistance area of the second strain detector.

17. The acceleration sensor of claim 11 wherein the first contact holes are mutually aligned in a longitudinal direction of the beam and the second contact holes are mutually aligned in the longitudinal direction of the beam.

* * * * *